Patented Nov. 9, 1937

2,098,811

UNITED STATES PATENT OFFICE 2,098,811

COMPOSITE BODY

Hans Pulfrich, Berlin-Wilmersdorf, Germany, assignor to General Electric Company, a corporation of New York No Drawing. Application July 16, 1935, Serial No. 31,719. In Germany July 25, 1934

5 Claims. (Cl. 49—81)

The present invention relates to a composite body comprising a new refractory ceramic material. It is the object of my invention to provide refractory materials which are adapted to make a vacuum-tight or hermetical seal when welded or joined by fusion to glass or by means of glass to metal.

The new compositions embodying my invention comprise titanates or zirconates of earth metals, such as magnesium or beryllium. A preferred embodiment of my invention has as main components magnesium oxide and titanium oxide in equal parts by weight.

In the production of vacuum tubes, and the like, it is frequently desired to join a refractory body directly to glass. Such a union involves great difficulty especially when soft glass is employed. Upon cooling cracks occur which cause leaks.

In utilizing my invention there is joined to the glass component a ceramic material which has as main components oxide of the class consisting of magnesium and beryllium and oxide of the class consisting of titanium and zirconium. Although it is preferred to use substantially pure compositions the use of modifying additions is not precluded, for example, agents to reduce the sintering temperature. Such materials can be readily sintered at about 1400 to 1500° C. The sintered bodies are gas-tight and are stable and resistant to temperature changes. They can be fusion-sealed to soft glass, such seals causing no difficulties due to the favorable expansion coefficient. Likewise, fusion seals with metals, such as copper-clad wire, chrome-iron, chrome-nickel, and iron-nickel alloys, platinum, etc. can be readily made. For this purpose, an enamel or soft glass may be used as a sealing agent, that is to say, a material such as glass is bonded to the metal, and to the glass is fusion-welded ceramic material of the kind herein described. The metals also may be joined by spray deposition or by sinter deposition.

Although magnesium oxide is employed in preferred embodiments of my invention, magnesium oxide may be partly or wholly replaced by beryllium oxide; also, titanium oxide may be replaced partly or wholly by zirconium oxide. I desire by the accompanying claims to cover all such variations and modifications of my invention.

The following materials in which the ingredients are indicated in molecular proportions are illustrative of my invention:

| | |
|---|---|
| 2 mols magnesium oxide | 1 mol. titanium oxide |
| 1 mol. magnesium oxide | 1 mol. titanium oxide |
| 2 mols beryllium oxide | 1 mol. titanium oxide |
| 1 mol. beryllium oxide | 1 mol. titanium oxide |
| 2 mols magnesium oxide | 1 mol. zirconium oxide |
| 1 mol. magnesium oxide | 1 mol. zirconium oxide |
| 2 mols beryllium oxide | 1 mol. zirconium oxide |
| 1 mol. beryllium oxide | 1 mol. zirconium oxide |

The readiness with which the ceramic bodies embodying my invention can be fusion-sealed to glass renders them particularly suitable for the fabrication of vacuum tubes. For example, in the manufacture of incandescent lamps and electrical discharge tubes, it is possible to employ plates consisting of such materials which replace the heretofore customary stem and base construction. Besides effecting a simplification and reduction in size of the construction the use of such materials effects a saving of metal. It is possible to make the entire electric vacuum tube container from material embodying my invention and to make electrode supports from such material.

In my co-pending application Serial No. 118,677, filed December 31, 1936, which application is a continuation-in-part of the present application, I have made claims to a ceramic material which may be used in making a composite body such as disclosed and claimed in this application.

What I claim as new and desire to secure by Letters Patent of the United States is:

1. A composite body consisting in part of a glass member and in part of a member of magnesium titanate, said members being fusion-welded to one another.

2. A composite body comprising a glass member and a member composed of a ceramic material having as main components oxide of the class consisting of magnesium and beryllium and oxide of the class consisting of titanium and zirconium, said members being fusion-welded to one another.

3. A composite body consisting in part of a glass member and in part of a member of a compound having as a base component beryllium oxide and having as an acid component an oxide of the class consisting of titanium and zirconium, said members being fusion-welded to one another.

4. A composite body comprising a glass member and a member composed of a ceramic material having as main components magnesium oxide and titanium oxide, said members being fusion-welded to one another.

5. A composite body comprising a metallic member, a glass member bonded to said metallic member, and fusion-welded to said glass member a member composed of a ceramic material having as main components oxide of the class consisting of magnesium and beryllium and oxide of the class consisting of titanium and zirconium.

HANS PULFRICH.

DISCLAIMER 2,098,811.—*Hans Pulfrich*, Berlin-Wilmersdorf, Germany. COMPOSITE BODY. Patent dated November 9, 1937. Disclaimer filed May 2, 1939, by the assignee, *General Electric Company*.

Hereby enters this disclaimer to claims 1 and 4 of said Letters Patent.

[*Official Gazette May 23, 1939.*]